United States Patent [19]

Parker et al.

[11] Patent Number: 5,039,737
[45] Date of Patent: Aug. 13, 1991

[54] OZONOLYSIS OF HYDROGENATED LATICES

[75] Inventors: Dane K. Parker, Massillon; James R. Purdon, Jr., Stow, both of Ohio

[73] Assignee: The Goodyear Tire & Rubber Company/Olin Corp., Akron, Ohio

[21] Appl. No.: 481,390

[22] Filed: Feb. 22, 1990

[51] Int. Cl.⁵ .................. C08L 9/04; C08L 13/02; C08F 6/16
[52] U.S. Cl. .................. 524/804; 524/828; 524/836; 525/329.3; 525/332.9; 525/333.1; 525/333.2; 525/388; 528/483; 528/490
[58] Field of Search .................. 525/329.3, 338, 388, 525/332.9, 333.1, 333.2; 528/483, 490; 524/804, 828, 836

[56] References Cited

U.S. PATENT DOCUMENTS

| | | | |
|---|---|---|---|
| 3,959,343 | 5/1976 | Arashi et al. | 260/465.5 R |
| 3,969,466 | 7/1976 | Brown et al. | 260/554 |
| 4,317,741 | 3/1982 | Lederle et al. | 252/77 |
| 4,336,356 | 6/1982 | Aharoni et al. | 525/388 |
| 4,452,950 | 6/1984 | Wideman | 525/339 |
| 4,532,318 | 7/1985 | Abubakari et al. | 528/483 |
| 4,954,614 | 9/1990 | Schiessl et al. | 528/483 |

Primary Examiner—Fred Teskin
Attorney, Agent, or Firm—Alvin T. Rockhill

[57] ABSTRACT

The subject invention relates to a process for treating an emulsion of a crosslinked elastomeric polymer containing residual hydrazine to obtain a latex of soluble elastomeric polymer having a reduced concentration of residual hydrazine therein, said process comprising the addition of ozone to said emulsion in an amount and under conditions which are sufficient for the ozone to react with the crosslinked elastomeric polymer and the residual hydrazine to produce a latex of soluble elastomeric polymer having a reduced level of residual hydrazine therein. The process of the present invention also improves the color of latex by removing color-bodies, such as benzoquinone, which may be present in the original latex.

16 Claims, No Drawings

OZONOLYSIS OF HYDROGENATED LATICES

BACKGROUND OF THE INVENTION

In some cases, it is desirable to hydrogenate rubber to improve resistance to oxidative and thermal degradation. For example, it is sometimes beneficial to hydrogenate nitrile rubbers which are utilized in applications where there is exposure to high operating temperatures. The hydrogenation of polymers has conventionally been accomplished by solution techniques which require the use of highly reactive chemicals or heterogeneous catalysts. Unfortunately, such techniques present handling and application difficulties. However, these difficulties are overcome by hydrogenating the rubber in latex form as described in U.S. Pat. No. 4,452,950 to Lawson G. Wideman.

The process disclosed by Wideman involves the hydrogenation of carbon-carbon double bonds of an unsaturated polymer which comprises (a) combining an unsaturated polymer in latex form with (1) an oxidant selected from the group consisting of oxygen, air and hydroperoxides: (2) a reducing agent selected from the group of hydrazine and hydrates thereof: and (3) a metal ion initiator: and (b) heating the mixture to a temperature from 0° C. to the reflux temperature of the reaction mixture. There are, of course, many advantages associated with hydrogenating the elastomeric polymer in latex form by the process of Wideman. However, there are difficulties which must be overcome to make the process described by Wideman commercially viable. For example, when high degrees of saturation are attained by the Wideman process, crosslinking of the polymer within the individual latex particles typically occurs. This is due to crosslinking of the elastomeric polymer which occurs during the reduction procedure. Such crosslinking is often undesirable with it usually being preferred for the elastomeric polymer to be uncrosslinked. Another problem encountered is the presence of residual hydrazine in the emulsion of the hydrogenated elastomeric polymer. The presence of high levels of residual hydrazine in the latex is commercially unacceptable. In fact, it is highly desirable for the level of residual hydrazine in the latex to be less than about 10 ppm (parts per million). In most cases, it is preferred for the concentration of residual hydrazine in the latex to be less than about 4 ppm.

SUMMARY OF THE INVENTION

By practicing the process of this invention, elastomeric polymers which have been reduced in latex form by the technique of Wideman can be treated to eliminate gel and simultaneously reduce the concentration of residual hydrazine present in the latex. This procedure involves treating the reduced latex with ozone which serves the dual function of reducing the level of gelled (crosslinked) polymer and residual hydrazine in the latex. It also improves the color of latex by removing color-bodies, such as benzoquinone, which may be present in the reduced latex.

The subject invention specifically discloses a process for treating an emulsion of a crosslinked elastomeric polymer containing residual hydrazine to obtain a latex of soluble (uncrosslinked) elastomeric polymer having a reduced concentration of residual hydrazine therein, said process comprising the addition of ozone to said emulsion in an amount and under conditions which are sufficient for the ozone to react with the crosslinked elastomeric polymer and the residual hydrazine to produce a latex of soluble (essentially uncrosslinked) elastomeric polymer having a reduced level of residual hydrazine therein.

The subject invention also reveals a process for reducing the concentration of residual hydrazine in an emulsion of an elastomeric polymer which comprises treating the emulsion with ozone in amounts and under conditions which are sufficient to reduce the concentration of the residual hydrazine in the emulsion.

DETAILED DESCRIPTION OF THE INVENTION

The emulsions which are treated in accordance with this invention are normally made by the process of Wideman (U.S. Pat. No. 4,452,950), the teachings of which are incorporated herein by reference in their entirety. The technique of Wideman is essentially a process for hydrogenating carbon-carbon double bonds in an unsaturated elastomeric polymer in latex form which comprises combining the unsaturated elastomeric polymer latex with (1) an oxidant selected from the group consisting of oxygen, air and hydroperoxides; (2) a reducing agent selected from the group consisting of hydrazine and hydrates of hydrazine; and (3) a metal ion activator. This hydrogenation reaction can be carried out at virtually any temperature within the range of about 0° C. to about 300° C. It is generally preferred to conduct the hydrogenation reaction at a temperature within the range of about 20° C. to about 150° C. with temperatures of less than 100° C. being most preferred to ensure selective hydrogenation and to inhibit undesirable side-reactions. This hydrogenation reaction is typically carried out at a temperature ranging from atmospheric pressure to 300 kg/cm$^2$.

Oxygen will typically be utilized in carrying out the hydrogenation procedure of Wideman. However, it is also possible to utilize air or other oxidants such as hydrogen peroxide, cumyl hydroperoxide, t-butyl hydroperoxide, p-methane hydroperoxide, and the like. A wide variety of metals having ions or salts which will react with hydrazine can be utilized as the metal ion activator. Antimony, arsenic, bismuth, cerium, chromium, cobalt, copper, gold, iron, lead, manganese, mercury, molybdenum, nickel, osmium, palladium, platinum, cerium, silver, tellurium, tin, and vanadium are representative of metals having ions or salts which will react with hydrazine and which are accordingly useful in the hydrogenation technique of Wideman as the metal ion activator. Iron and copper are preferred metal ion activators with iron being most preferred.

It is also well known that various agents such as hydroquinone, catechol, quinone, o-phenylene diamine, and cerium, will catalyze the reaction between hydrogen peroxide or oxygen and hydrazine. Such reactions are described by Zhong and Lim, "The Copper-Catalyzed Redox Reaction Between Aqueous Hydrogen Peroxide and Hydrazine. 1. New Experimental Results and Observations", Journal of The American Chemical Society, Vol. 111, No. 22, pages 8398–8404 (1989) at page 8401. In accordance with the teachings of Zhong and Lim, hydroquinone can be utilized to catalyze the reaction of oxygen with residual hydrazine in an aqueous emulsion of a rubber reduced in accordance with the process of Wideman. By utilizing this technique, the level of residual hydrazine in a latex can be reduced from typical levels of about 1 to 2 percent to levels within the range of about 50 ppm to about 100 ppm. This can be accomplished by simply mixing oxygen and a small amount of the catalyst, such as hydroquinone, catechol, quinone, or o-phenylene diamine into the latex containing residual hydrazine. This procedure may be accelerated by increasing the catalyst concentration, temperature and oxygen pressure as desired. Typically from about 0.001 phr to about 1 phr (parts per weight per hundred parts of rubber) of the catalyst will be utilized. In most cases the amount of catalyst employed will be within the range of about 0.05 phr to about 0.25 phr. Unfortunately, this procedure is not a total answer to the problem because it will not normally reduce levels of residual hydrazine to the extremely low levels desired. However, it is often desirable to utilize this crude technique as an intermediate measure for reducing the level of residual hydrazine in latex. In other words, it is often desirable to initially treat latex with oxygen or hydrogen peroxide and a catalyst to reduce the level of residual hydrazine in the latex to about 50 to 100 ppm and then to subsequently treat the latex with ozone in accordance with the process of the present invention.

Virtually any type of hydrogenated rubber latex can be treated by the process of this invention. For example, the latex can be of a polybutadiene rubber, polyisoprene, nitrile rubber, carboxylated nitrile rubber, styrene-butadiene rubber, styrene-isoprene-butadiene rubber, etc. Such hydrogenated rubbers will typically have a saturation level of about 90% to about 99%. It is preferred for the hydrogenated rubber to have a saturation level of about 95% to about 98%. In practicing the present invention, ozone is simply mixed with the latex for a period of time which is sufficient to attain the desired results. This can be accomplished by bubbling ozone through the latex. It can also be done by rapidly agitating the latex under an ozone containing atmosphere. It may be desirable for the ozone containing atmosphere to be under pressure. Other techniques for mixing ozone throughout the latex being treated can also be employed in practicing the present invention. The temperature at which this treatment procedure is carried out is not critical. In fact, virtually any temperature between the freezing point of the latex and its boiling point can be utilized. However, for practical reasons, the latex will normally be treated with ozone at a temperature which is within the range of about 0° C. to about 60° C. A temperature within the range of about 15° C. to about 30° C. will most preferably be employed. Higher temperatures can result in reduced solubility of the ozone in the latex even through faster reaction rates may be attained. The ozone treatment will be carried out for a time which is sufficient to eliminate undesirable levels of crosslinking and which is sufficient to reduce residual hydrazine concentrations to acceptable levels. The treatment time employed will typically be within the range of about 15 minutes to about 6 hours. The period of time utilized in treating the latex with ozone will more typically be within the range of about 30 minutes to about 2 hours.

The gelation which can occur during the hydrogenation procedure is essentially due to crosslinking of the elastomeric polymer in the emulsion. By treating the emulsion of the crosslinked elastomeric polymer with ozone, an ozonolysis reaction occurs. In this ozonolysis reaction, the remaining double bonds in the crosslinked rubber are attacked with ozonides being formed. The ozonides formed under the low temperature condition of the reaction are highly unstable and are destroyed by hydrolysis with the water in the latex. This results in the cleavage of the crosslinked elastomeric polymer into rubber segments of lower molecular weight which are generally terminated with aldehyde groups. Continued ozonolysis will subsequently oxidize the initial aldehyde groups to carboxylic acid groups. The terminal aldehyde groups on the rubber segments can also be reduced to alcohols by the addition of agents such as sodium borohydride in ethanol at temperatures within the range of about $-20°$ C. to about 0° C. if desired. In any case, the resulting polymer is essentially uncrosslinked and soluble in typical solvents for the rubber. Solutions of such "soluble" polymers will pass through 325 mesh screen.

After the latex has been treated with ozone, it can be utilized in a conventional manner. The latex can also be coagulated to recover a dry rubber. Standard coagulation techniques, such as salt-acid coagulation procedures, can be employed. However, it should be noted that latex stability improves with ozonation due to the generation of additional carboxylate-terminated soap-like polymer fragments. This feature, although often desirable, will necessitate the use of additional coagulant, the amount of which will be dictated by the level of carboxylate generated.

The present invention will be described in more detail in the following examples. These examples are merely for the purpose of illustration and are not to be regarded as limiting the scope of the invention or the manner in which it can be practiced. Unless specifically indicated otherwise, all parts and percentages are given by weight.

EXAMPLE 1

A nitrile rubber latex was hydrogenated by utilizing the process of Wideman to a saturation level of 96.2%. The latex was treated with oxygen and a small amount of hydroquinone which reduced the level of residual hydrazine to 58.5 ppm. Approximately 150 ml (milliliters) of this latex was then placed in a beaker with a magnetic stirrer and treated with excess ozone (as an ozone/air mixture). Samples were taken and tightly sealed in 20 ml vials at 15 minute intervals. Another 150 ml latex sample was also treated with nitrogen as a control. Samples of the latex treated with nitrogen were also taken at 15 minute intervals. The samples taken were analyzed for residual hydrazine. The results of these experiments are shown in Table I.

TABLE I

| Treatment | Residual Hydrazine. ppm | |
|---|---|---|
| Time | Ozone | Nitrogen |
| 0 min. | 58.5 | 58.5 |
| 15 min. | 28.5 | 47.3 |
| 30 min. | 8.2 | 45.5 |
| 45 min. | 5.8 | 35.6 |
| 60 min. | 2.9 | 31.7 |

As can be seen in Table I, ozone treatment is capable of reducing the level of residual hydrazine in the latex to less than 3 ppm. Thus, the process of this invention is a viable means for reducing the level of residual hydrazine in a latex to extremely low levels. The control experiments which were conducted utilizing nitrogen at the same flow rate as the air/ozone mixture also caused the level of residual hydrazine in the latex to be reduced. However, after 60 minutes of treatment with nitrogen, the level of residual hydrazine was only reduced to 31.7 ppm. A semi-log plot of the data was made and it indicates that the rates of reducing residual hydrazine levels are essentially first order for both ozone and nitrogen.

EXAMPLE 2

A nitrile rubber latex was hydrogenated by the procedure of Wideman as described in Example 1. A 3 ml sample of the latex was coagulated in a methanol/-saturated sodium chloride solution. Then 0.3 g of the methanol-wet, blotted polymer was dissolved in a solution containing 15 ml of trichloromethane and 1 ml of acetonitrile. A highly insoluble swollen gel resulted. Although the molecular weight of the insoluble gel is essentially infinite, a small portion of the polymer will dissolve in a suitable solvent such as a mixture of trichloromethane and acetonitrile. This untreated partially soluble fraction was determined to have a number average molecular weight of 135,000, a weight ratio molecular weight of 543,000, and an intrinsic viscosity of 3.249.

A 150 ml sample of the hydrogenated latex was placed in a 400 ml beaker with a magnetic stir bar and treated with excess air/ozone over a 6 hour period at room temperature. After approximately 2.5 hours of ozone treatment, a portion of the latex was coagulated in the trichloromethane/acetonitrile solvent showed no gel. Thus, the ozone treatment of this invention is an effective means of eliminating gel which is formed as a result of the hydrogenation procedure of Wideman. The polymer recovered was determined to have a number average molecular weight of 16,000, a weight ratio molecular weight of 37,000, and an intrinsic viscosity of 0.225 after approximately 2.5 hours of ozone treatment.

These examples show that the technique of this invention can be utilized to eliminate gel and residual hydrazine from latices. The utilization of the technique of this invention also improves the color of latices by removing color-bodies, such as benzoquinone. Because rubbers made by utilizing the process of this invention contain terminal carboxyl groups, they can be cured with agents conventionally employed in curing carboxylated rubbers, such as zinc oxide or magnesium oxide. It may also be desirable to utilize peroxide crosslinking agents, such as dicumyl peroxide, 2,5-bis(tert-butylperoxy)-2,5-dimethylhexane, or 2,5-dimethyl-2,5-di(t-butylperoxy)hexane-3, in the curative formulation since the rubber has a very high level of saturation.

While certain representative embodiments and details have been shown for the purpose of illustrating the subject invention, it will be apparent to those skilled in this art that various changes and modifications can be made without departing from the scope of the subject invention.

What is claimed:

1. A process for treating an emulsion of a crosslinked elastomeric polymer containing residual hydrazine to obtain a latex of soluble elastomeric polymer having a reduced concentration of residual hydrazine therein, said process comprising the addition of ozone to said emulsion in an amount and under conditions which are sufficient for the ozone to react with the crosslinked elastomeric polymer and the residual hydrazone to produce a latex of soluble elastomeric polymer having a reduced level of residual hydrazine therein.

2. A process as specified in claim 1 wherein the elastomeric polymer is a nitrile rubber.

3. A process as specified in claim 1 wherein the process is carried out at a temperature which is within the range of about 0° C. to about 60° C.

4. A process as specified in claim 1 wherein said process is carried out at a temperature which is within the range of about 15° C. to about 30° C.

5. A process as specified in claim 1 wherein said process is carried out for a period of time which is within the range of about 15 minutes to about 6 hours.

6. A process as specified in claim 1 wherein said elastomeric polymer has a saturation level of about 90% to about 99%.

7. A process as specified in claim 1 wherein said elastomeric polymer has a saturation level of about 95% to about 98%.

8. The latex of soluble elastomeric polymer made by the process specified in claim 1.

9. A process as specified in claim 1 wherein said process is carried out for a period of time which is within the range of about 30 minutes to about 2 hours.

10. A process as specified in claim 1 wherein the elastomeric polymer is a polybutadiene rubber.

11. A process as specified in claim 1 wherein the elastomeric polymer is polyisoprene.

12. A process as specified in claim 1 wherein the elastomeric polymer is carboxylated nitrile rubber.

13. A process as specified in claim 1 wherein the elastomeric polymer is a styrene-butadiene rubber.

14. A process as specified in claim 1 wherein the elastomeric polymer is a styrene-isoprene-butadiene rubber.

15. A process as specified in claim 2 wherein the process is carried out at a temperature which is within the range of about 0° C. to about 60° C. and wherein said process is carried out for a period of time which is within the range of about 15 minutes to about 6 hours.

16. A process as specified in claim 2 wherein said process is carried out at a temperature which is within the range of about 15° C. to about 30° C. and wherein said process is carried out for a period of time which is within the range of about 30 minutes to about 2 hours.

* * * * *